UNITED STATES PATENT OFFICE.

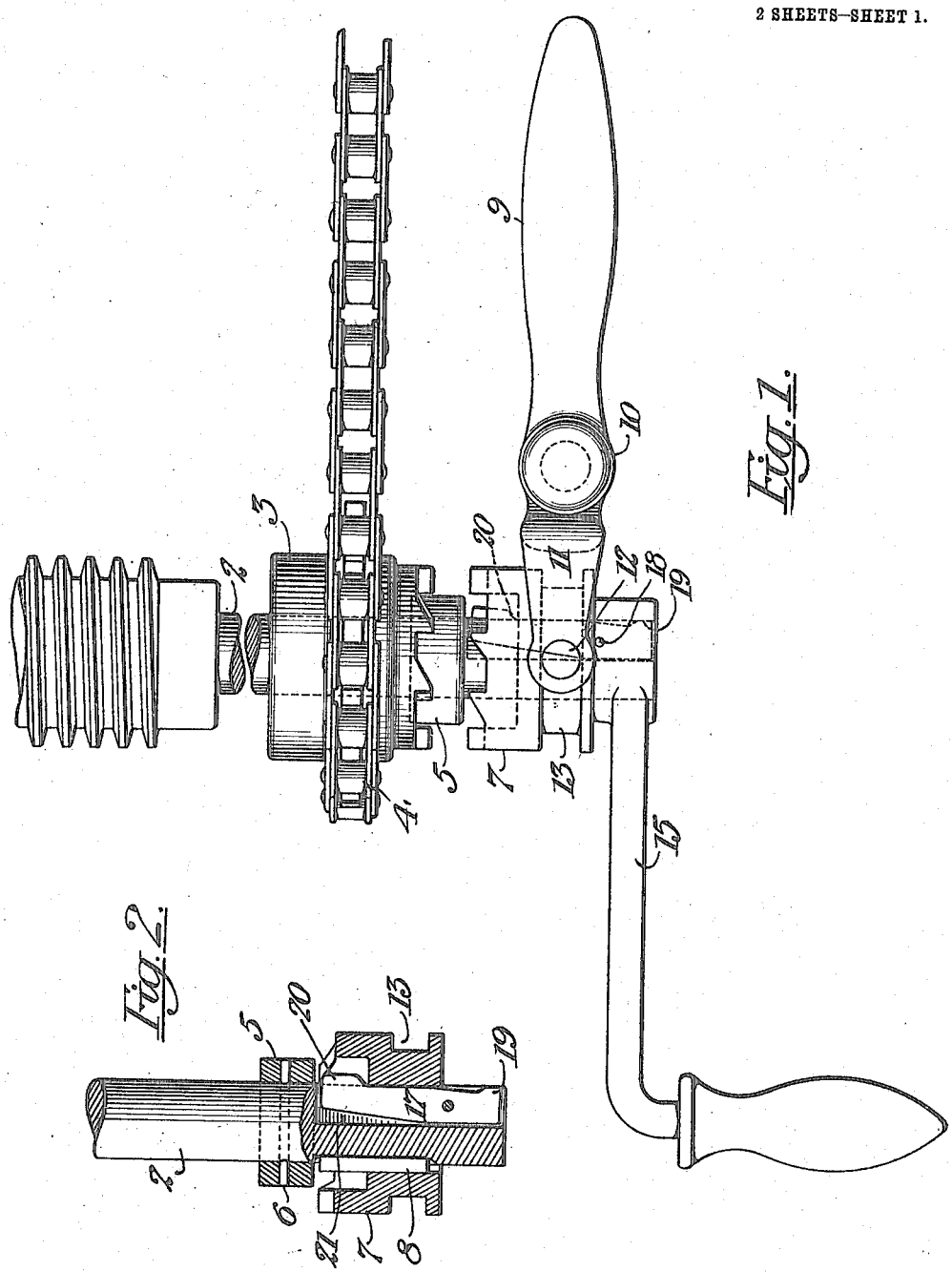

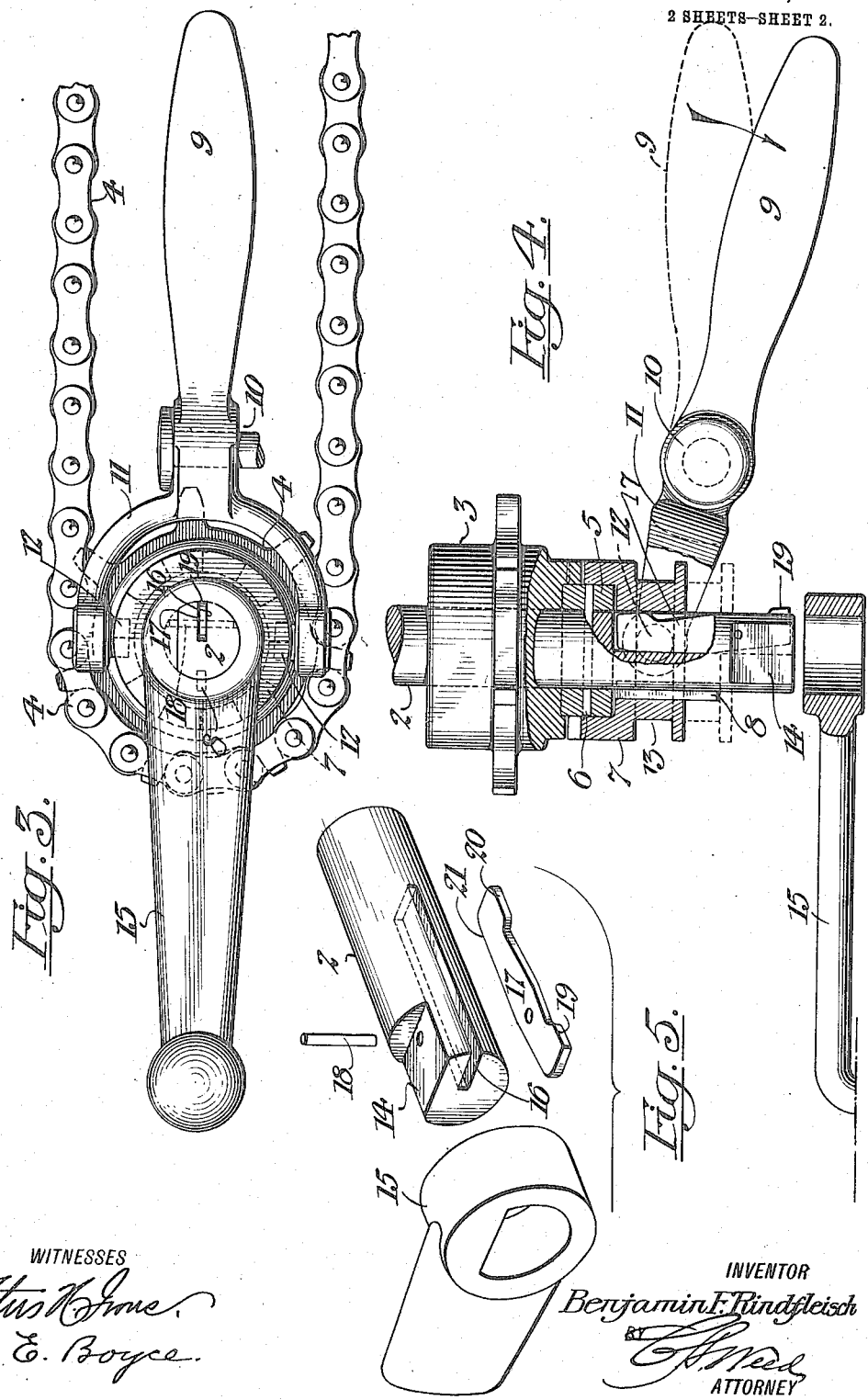

BENJAMIN F. RINDFLEISCH, OF CLEVELAND, OHIO, ASSIGNOR TO THE NATIONAL-ACME MANUFACTURING COMPANY, OF CLEVELAND, OHIO, A CORPORATION OF OHIO.

SAFETY DEVICE.

1,133,318.   Specification of Letters Patent.   Patented Mar. 30, 1915.

Application filed October 24, 1914.   Serial No. 868,367.

*To all whom it may concern:*

Be it known that I, BENJAMIN F. RINDFLEISCH, a citizen of the United States, residing at Cleveland, in the county of Cuyahoga and State of Ohio, have invented certain new and useful Improvements in Safety Devices, of which the following is a specification.

This invention relates to an improved safety device for use in connection with machines, such as automatic screw machines or lathes, having a shaft carrying a pair of mating clutch members and which shaft is adapted to receive a crank handle for turning the same by hand, the object of the invention being to provide a safety device which will effectively prevent the clutch members being brought into engagement when the crank handle is on the end of the shaft and will also prevent the crank handle from being placed on the shaft while the clutch members are in engagement, the device being extremely simple in construction and effective in operation.

In the operation of automatic multiple spindle screw machines, the main driving or worm shaft carries a pair of mating clutch members, one loose on such shaft and the other splined or keyed to the shaft and provided with lever mechanism whereby it may be shifted into engagement with the loosely mounted clutch member, to which motion is imparted from any suitable source of power by suitable means, such for instance as a chain and sprocket mechanism. In such machines the end of the driving shaft is usually adapted to receive a crank handle by means of which the operator when "setting up" the machine can rotate the shaft by hand so as to bring the cams on the cam shaft, which is operated by the worm on the driving shaft, to the proper position to start the work, and it frequently happens that through carelessness the crank handle is left on the shaft when the clutch members are brought into engagement, and as the shaft is rotated very rapidly serious accidents are liable to occur should anyone be near enough to be struck by the crank handle.

The object, therefore, of the present improvement is to provide a safety device whereby it will be impossible to shift the clutch members into engagement while the crank handle remains on the end of the shaft and whereby it will also be impossible to place the crank handle on the end of the shaft while the clutch members are in engagement.

In the drawings accompanying and forming part of this specification, Figure 1 is a plan view of a driving or worm shaft such as is used in an automatic multiple spindle screw machine, having this improved safety device applied thereto, the shaft being shown broken away, and showing in dotted lines the position of the safety device when the clutch members are disengaged and the crank handle applied to the shaft; Fig. 2 is a sectional side elevation of the end of the shaft to which the safety device is attached, and also showing the position of the safety device when the clutch members are disengaged; Fig. 3 is an end view of the parts shown in Fig. 1; Fig. 4 is a side-partly sectional, view showing the position of the safety device when the clutches are in engagement, the dotted lines showing the position of the clutch shifting lever and the shiftable clutch member when the clutches are disengaged, the arrow showing the direction in which the lever is pulled so as to shift the clutch members into engagement; and Fig. 5 illustrates in perspective the details of construction of the end of the shaft for attachment of the safety device and the handle for turning the shaft, the safety device and a portion of the handle, as well as the pin for pivoting said safety device in the shaft, being also shown.

Similar characters of reference indicate corresponding parts in the different figures of the drawings.

In the present instance the worm shaft 2 has loosely mounted thereon the clutch member 3, to which motion is imparted from any suitable source of power by means of any suitable motion transmitting mechanism, as for instance a sprocket and chain mechanism 4, the clutch member being held from sliding on the shaft 2 by means of a collar 5 secured on said shaft in any suitable manner, for instance by means of a pin 6 passing through said collar and shaft. A coöperating clutch member 7 is slidingly mounted on the shaft 2 by means of a key 8, and this clutch member 7 is shifted into and out of engagement with the clutch member 3 by means of a lever 9 pivoted, as at 10, at any convenient point on the machine or otherwise, the clutch engaging end of the lever being of yoke-shaped formation, as 11, and each end of the yoke is provided with a projecting stud and roller 12 for engagement with a circumferential groove 13 formed in the clutch member 7.

The shaft 2 is formed at its end, as at 14 Fig. 5, to receive thereon a crank handle 15 for turning the shaft by hand when "setting up" the machine, and the gist of this invention is to provide a device whereby it will be impossible to place this handle on the end of the shaft while the clutch members are in engagement, and vice versa. For this purpose, the end of the shaft 2 is provided with a longitudinal slot 16, in which is pivoted a lever 17 by means of a pin 18 extending through the side walls of such slot and through the lever. The lever 17 is provided at the outer edge thereof, in other words the edge adjacent to the circumference of the shaft 2, with a pair of projecting lugs 19 and 20, one at each end, and the lever is so formed at its inner edge, as at 21, and so pivoted that when one of the lugs is even with the circumference of the staft 2 the other lug extends above the shaft, the remaining portion of the outer edge of the lever 17 being even with or somewhat below the circumferential surface of the shaft 2.

From the foregoing it will be apparent that when the clutch members 7 and 3 are in engagement the lug 20 will be depressed in the slot by reason of its contact with the inner surface of the sliding clutch member 7, while, owing to the pivotal action of the lever 17, the lug 19 will project above the surface of the shaft and into the path of the handle socket, thereby making it impossible to place the crank handle 15 thereon. On the other hand, if the clutch members are disconnected and the handle 15 is on the shaft, the inner surface of the socket of such handle will depress the lug 19 into the slot, thereby causing the lug 20 to project above the surface of the shaft into the path of the shiftable clutch member and prevent the clutch member 7 from being shifted into engagement with the coöperating clutch member 3 while the handle remains on the shaft, whereby the liability of accidents caused by the rotation of this handle with the shaft is entirely avoided.

It will be understood, of course, that the various details of construction may be more or less modified without departing from the spirit and scope of this invention.

I claim as my invention:

1. The combination of a driven shaft, means thereon for connecting it with a source of power, means for throwing said means into and out of operation, means for manually rotating said shaft, and a safety device in position to prevent the positioning of said last means when the shaft is connected with the source of power and the connection of said shaft with said source of power when said last means is in position on the shaft.

2. The combination of a driven shaft, a clutch thereon for connecting it with a source of power, means for throwing said clutch into and out of operation, means for manually rotating said shaft, and a safety device in position to prevent the positioning of said last means when the shaft is connected with the source of power and the connection of said shaft with said source of power when said last means is in position on the shaft.

3. The combination of a driven shaft, means thereon for connecting it with a source of power, means for throwing said means into and out of operation, means for manually rotating said shaft, and a pivoted member carried by the shaft and in position to prevent the positioning of said last means when the shaft is connected with the source of power and the connection of said shaft with said source of power when said last means is in position on the shaft.

4. The combination of a shaft carrying a pair of cooperating clutch members, means for engaging and disengaging said clutch members, means adapted to engage said shaft for manually rotating it, and means for preventing the engagement of said clutch members while the rotating means is in operative position.

5. The combination of a shaft carrying a pair of coöperating clutch members, means for engaging and disengaging said clutch members, means adapted to engage said shaft for manually rotating the same, and means for preventing the positioning of said rotating means while the clutch members are in engagement.

6. The combination of a shaft carrying a pair of coöperating clutch members, means for engaging and disengaging said clutch members, means adapted to engage said shaft for manually rotating it, means for preventing the engagement of said clutch members while the rotating means is in operative position, and means for preventing the positioning of said rotating means while the clutch members are in engagement.

7. The combination of a shaft carrying a pair of coöperating clutch members, means for engaging and disengaging said clutch members, means adapted to engage said shaft for manually rotating it, and means for preventing the engagement of said clutch members while the rotating means is in operative position and the positioning of said rotating means while the clutch members are in engagement.

8. The combination of a shaft carrying a pair of coöperating clutch members, means for shifting one of said clutch members into and out of engagement with its coöperating clutch member, means adapted to engage said shaft for manually rotating it, and means carried by said shaft for preventing the operation of said clutch shifting means while said rotating means is in operative position.

9. The combination of a shaft carrying a pair of coöperating clutch members, means for shifting one of said clutch members into and out of engagement with its coöperating clutch member, means adapted to engage said shaft for manually rotating it, and means carried by said shaft for preventing the positioning of said rotating means while the clutch members are in engagement.

10. The combination of a shaft carrying a pair of coöperating clutch members, means for shifting one of said clutch members into and out of engagement with its coöperating clutch member, means adapted to engage said shaft for manually rotating it, means carried by said shaft for preventing the operation of said clutch shifting means while said rotating means is in operative position, and means also carried by said shaft for preventing the positioning of said rotating means when the clutch members are in engagement.

11. The combination of a shaft carrying a pair of coöperating clutch members, means for shifting one of said clutch members into and out of engagement with its coöperating clutch member, means adapted to engage said shaft for manually rotating it, and means carried by said shaft for preventing the operation of said clutch shifting means while said rotating means is in operative position and for preventing the positioning of said rotating means when the clutch members are in engagement.

12. The combination of a shaft carrying a pair of coöperating clutch members, means for engaging and disengaging said clutch members, means adapted to engage said shaft for manually rotating it, and means for preventing the engagement of said clutch members while the rotating means is in operative position and comprising a member having a part thereof adapted to project into the path of one of said clutch members.

13. The combination of a shaft carrying a pair of coöperating clutch members, means for engaging and disengaging said clutch members, means adapted to engage said shaft for manually rotating it, and means for preventing the engagement of said clutch members while the rotating means is in operative position and comprising a pivoted member having a part thereof adapted to project into the path of one of said clutch members.

14. The combination of a shaft carrying a pair of coöperating clutch members, means for engaging and disengaging said clutch members, means adapted to engage said shaft for manually rotating it, and means for preventing the positioning of said rotating means while the clutch members are in engagement and comprising a member having a part thereof adapted to project into the path of said rotating means.

15. The combination of a shaft carrying a pair of coöperating clutch members, means for engaging and disengaging said clutch members, means adapted to engage said shaft for manually rotating it, and means for preventing the positioning of said rotating means when the clutch members are in engagement and comprising a pivoted member having a part thereof adapted to project into the path of said rotating means.

16. The combination of a shaft carrying a pair of coöperating clutch members, means for engaging and disengaging said clutch members, means adapted to engage said shaft for manually rotating it, and means for preventing the engagement of said clutch members while the rotating means is in operative position and the positioning of said rotating means when the clutch members are in engagement and comprising a member having a part thereof adapted to project into the path of one of said clutch members and a part thereof adapted to project into the path of said rotating means.

17. The combination of a shaft carrying a pair of coöperating clutch members, means for engaging and disengaging said clutch members, means adapted to engage said shaft for manually rotating it, and means for preventing the engagement of said clutch members while the rotating means is in operative position and the positioning of said rotating means when the clutch members are in engagement and comprising an oscillatory member having a part adapted to project into the path of one of said clutch members and a part adapted to project into the path of said rotating means.

18. The combination of a shaft carrying a pair of coöperating clutch members, means for engaging and disengaging said clutch members, means adapted to engage said shaft for manually rotating it, and means for preventing the engagement of said clutch members while the rotating means is in operative position and the positioning of said rotating means when the clutch members are in engagement and comprising a swinging lever carried by said shaft and having a part adapted to project into the path of one of said clutch members and a part adapted to project into the path of said rotating means.

19. The combination of a shaft carrying a pair of coöperating clutch members and having its end adapted to receive a crank handle thereon, said shaft being provided with a longitudinally extending slot opening at the side thereof, means for shifting one of said clutch members into and out of engagement with its coöperating clutch member, and a member pivoted in the slot of said shaft and having a part adapted to project into the path of said shiftable clutch member when the crank handle is in engagement with said shaft.

20. The combination of a shaft carrying a pair of coöperating clutch members and having its end adapted to receive a crank handle thereon, said shaft being provided with a longitudinally extending slot opening at the side thereof, means for shifting one of said clutch members into and out of engagement with its coöperating clutch member, and a member pivoted in the slot of said shaft and having a part adapted to project into the path of said crank handle when the clutch members are in engagement.

21. The combination of a shaft carrying a pair of coöperating clutch members and having its end adapted to receive a crank handle thereon, said shaft being provided with a longitudinally extending slot opening at the side thereof, means for shifting one of said clutch members into and out of engagement with its coöperating clutch member, and a member pivoted in the slot of said shaft and having a part adapted to project into the path of said crank handle when the clutch members are in engagement and a part adapted to project into the path of said shiftable clutch member when the crank handle is in engagement with said shaft.

Signed at Cleveland, in the county of Cuyahoga and State of Ohio, this 22nd day of October, 1914.

BENJAMIN F. RINDFLEISCH.

Witnesses:
 ALBERT E. HENN,
 SAMUEL M. MATHEWS.

Copies of this patent may be obtained for five cents each, by addressing the "Commissioner of Patents, Washington, D. C."